United States Patent [19]

Wyatt et al.

[11] 3,786,680

[45] Jan. 22, 1974

[54] VOLTAGE SENSING SYSTEM

[75] Inventors: Derek Gerald Wyatt, Oxford; Delia Margaret Clark, Almondsbury; Michael Anthony Warne, Brewood, all of England

[73] Assignees: Marston Excelsior Limited, Wolverhampton, Staffordshire; Derek Gerald Wyatt, Oxford, Oxfordshire; Delia Margaret Clark, Almondsbury, Somerset, all of, England

[22] Filed: Nov. 1, 1972

[21] Appl. No.: 302,676

Related U.S. Application Data

[62] Division of Ser. No. 144,292, May 17, 1971.

[52] U.S. Cl. ........ 73/194 EM, 324/30 B, 204/290 R
[51] Int. Cl. ........................... G01f 1/00, A61b 5/02
[58] Field of Search............ 73/194 EM; 204/290 R; 128/2.05 F, DIG. 4; 324/30 B

[56] References Cited
UNITED STATES PATENTS

| | | | |
|---|---|---|---|
| 1,524,937 | 2/1925 | Keeler | 204/290 R X |
| 3,234,110 | 2/1966 | Beer | 204/290 F X |
| 3,592,187 | 7/1971 | Youdin et al. | 73/194 EM X |
| 3,593,119 | 7/1971 | Brum et al. | 324/30 B |
| 3,659,591 | 5/1972 | Doll et al. | 73/194 EM |
| 3,684,543 | 8/1972 | deNora et al. | 204/290 F |

*Primary Examiner*—Charles A. Ruehl
*Attorney, Agent, or Firm*—Cushman, Darby & Cushman

[57] ABSTRACT

A system comprising means for providing an alternating magnetic field in a liquid phase so as to induce an alternating voltage therein, and a pair of contact electrodes positioned at right angles to the field to sense the alternating voltage thus induced, each of the electrodes being an electrode comprising a substrate body of a metal selected from the group consisting of gold, platinum and alloys thereof, with at least one coating of a precious metal or alloy fired on at least part of the surface of the body from a paint containing the precious metal or alloy, the electrode being characterized by its low impedance to the passage of alternating current even after repeated autoclaving in steam.

9 Claims, No Drawings

VOLTAGE SENSING SYSTEM

This is a division of application Ser. No. 144,292 filed May 17, 1971.

BACKGROUND OF THE INVENTION

This invention relates to electrodes and is particularly, but not exclusively, concerned with electrodes which have a low impedance to the passage of alternating current.

It has been known for many years how to measure the velocity of flow of blood in a blood vessel by the use of an electromagnetic flowmeter. Electromagnetic coils are used externally of the blood vessel to induce an alternating magnetic field transversely to the direction of blood flow, and contact electrodes are positioned externally of and transversely to the blood vessel at right-angles to the direction of the magnetic field. The alternating magnetic field will induce an alternating voltage in the blood, the magnitude of this voltage being dependent upon the velocity of blood flow, and this voltage is sensed by the contact electrodes.

In the use of such an electromagnetic flowmeter, the contact electrodes have to be small, a typical size being a diameter of 2mm. The voltages which are sensed by the contact electrodes are also very small and they must not be changed in phase or obscured by random electrical noise such as that which is produced by high contact resistance. Thus, any reliable measurement technique depends upon each contact electrode offering the lowest possible polarization resistance and capacitive reactance to the flow of alternating current.

In the known electromagnetic flowmeters the contact electrodes have usually been of stainless steel or of a noble metal, either in the form of short rods or of foil. For greater accuracy and lower noise level the electrodes are preferably coated with platinum black to obtain a low contact impedance. The coating can be done either before or after assembly. In the latter case handling difficulties occur. In addition flowmeters for medical use need to be sterilized, preferably by autoclaving in steam at temperatures up to about 136°C. This process rapidly increases the impedance of normal platinum black. The polarization resistance and capacitive reactance of the electrode surface need to be as low as possible, and both of these properties of a platinum black coated electrode are adversely affected by handling, autoclaving, heating and repeated exposure to salt water or blood. In particular, the capacitance of the electrode surface needs to be as high as possible in order to produce the minimum capacitive reactance, and the capacitance is reduced rapidly after a numbeof autoclavings.

Accordingly it is an object of the invention to provide an electrode which is capable of being used in situations in which a low impedance is required, and which is capable of being handled to a greater degree than an electrode having a platinum black surface.

SUMMARY OF THE INVENTION

In accordance with the invention, an electrode comprises a substrate of a precious metal or alloy, and a coating of a precious metal or alloy fired on at least part of the surface of the substrate from a paint containing the precious metal or alloy.

The term "precious metal or alloy" as used in this specification means gold, silver, platinum group metals, and alloys based on any of these metals. The platinum group metals are ruthenium, rhodium, palladium, osmium, iridium and platinum.

Preferably the coating is of a platinum-iridium alloy, typically about 70wt. percent platinum, balance iridium.

Preferably further the paint is a platinum-iridium resinate paint.

Preferably also the substrate is platinum or gold.

In accordance with the invention also, a method of manufacturing an electrode comprises taking a substrate of a precious metal or alloy, applying a paint containing a precious metal or alloy to at least part of the surface of the substrate, and firing the paint to produce a fired-on coating of the precious metal or alloy.

Preferably the paint is fired at about 450°C.

Preferably also the paint is dried at about 250°C prior to firing.

Preferably further the substrate is provided with a plurality of said coatings.

DESCRIPTION OF THE PREFERRED EMBODIMENTS

Typical examples of the invention will now be more particularly described. In a first example a sample of platinum foil is etched in fresh aqua regia by being heated therein to 75°C during a period of 5 minutes, and being held at that temperature for a further 5 minutes. The sample is then removed from the aqua regia and is rinsed in water and dried.

One surface of the sample is then provided with a coating of the platinum-iridium resinate paint obtainable under the trade name 'Hanovia Liquid Bright Platinum Grade IR1'. This paint has a metal content of about 70 parts platinum, 30 parts iridium by weight. The sample is dried firstly in air, and then at 250°C for 10 minutes, and is subsequently fired at 450°C in air for 20 minutes.

The sample is provided with four more coatings in the same way as that just described. This produces a coating of about 70wt. percent platinum, balance iridium. The coating has a very high surface area and is as readily wetted by aqueous solutions as platinum black.

The sample was tested by being subjected to alternating current at 240 Hertz in contact with 0.9 weight/cent aqueous sodium chloride at 18°C. A 1mm diameter disc had a polarization resistance comparable to that of a freshly manufactured platinum black surface, and a capacitance of over 11 micro-farads, which corresponds to a capacitance of greater than 1200 micro-farads per square centimetre. This is approximately of the same order as that obtained with a freshly manufactured platinum black surface. However, the capacitance of the electrode of this example was not affected by exposure to the sodium chloride solution for 24 hours, by exposure to 150°C for 1 hour, by firm polishing with lens tissue, by handling, by exposure to blood, or by 43 vacuum/steam autoclave cycles at 136°C. A further 590 vacuum/steam autoclave cycles at 136°C produced no effect upon the electrode. The mechanical adhesion of the coating was tested by bending the foil, and it was found to withstand without damage 180° bends produced by folding the foil onto itself and rolling it flat by hand with a brass rod.

A comparison test was carried out with a freshly manufactured platinum black coating on a platinum metal foil. After 6 vacuum/steam autoclave cycles at 136°C the polarization resistance of the coating doubled and the capacitance of the coating was reduced by a factor of 10.

Further examples of the invention were manufactured in the same way as that described above and their polarization resistance and capacitance measured at 240 and 480 Hertz. The results are listed in Table I below, the examples of the invention being numbered 2 to 8. Also included in Table I are comparative specimens 1 and 2 which are bright gold and aqua regia etched gold respectively. Specimen 3 is the etched gold of specimen 2 which has been provided with a coating of platinum black in the usual manner. All examples and specimens are 2 mm discs.

TABLE I

| Electrode | Hertz | Polarization Resistance (kilo-ohms) | Capacitance (micro-farads) |
|---|---|---|---|
| Example 2 | 240 | 0.176 | 30 |
| Example 2 | 480 | 0.173 | 30 |
| Example 3 | 240 | 0.175 | >60 |
| Example 3 | 480 | 0.173 | >60 |
| Example 4 | 240 | 0.182 | 30 |
| Example 4 | 480 | 0.180 | 26 |
| Example 5 | 240 | 0.174 | >60 |
| Example 5 | 480 | 0.174 | >60 |
| Example 6 | 240 | 0.170 | >60 |
| Example 6 | 480 | 0.168 | >60 |
| Example 7 | 240 | 0.174 | >60 |
| Example 7 | 480 | 0.172 | 53 |
| Example 8 | 240 | 0.174 | 54 |
| Example 8 | 480 | 0.172 | 44 |
| Specimen 1 | 240 | 0.90 | 0.24 |
| Specimen 1 | 480 | 0.52 | 0.22 |
| Specimen 2 | 240 | 0.21 | 3.8 |
| Specimen 2 | 480 | 0.20 | 3.1 |
| Specimen 3 | 240 | 0.175 | >60 |
| Specimen 3 | 480 | 0.173 | >60 |

The results of Table I show the parity between a freshly prepared platinum black surface (Specimen 3) and the platinum-iridium paint-applied surfaces of the present invention.

Examples 2 to 8 were also subjected to autoclave testing with vacuum/steam cycles at 136°C. After 100 such cycles all of these Examples were tested at 240 Hertz and Example 3, which was representative of the others, had a polarization resistance of 0.168 kilo-ohms and a capacitance of 50 micro-farads. For a conventional platinum black surface on platinum, the capacitance dropped rapidly at first, and was only 42 micro-farads after 100 of these cycles.

A further example of the invention, prepared in an identical manner to that described in the first example described above, was submitted to a severe blood-exposure test. 100 ml of blood-bank blood was maintained at 37°C in a beaker, and this further sample was immersed in the blood for 24 hours. The blood was then replaced by fresh blood-bank blood, and the same temperature was maintained for a further 24 hour immersion. This was repeated several times to give a total of 8 consecutive periods of 24 hours in fresh blood each day.

After cleaning there was no change in the polarization resistance or capacitance of the sample.

A platinum-black on platinum control was submitted to the same test, and its polarization resistance was higher and the capacitance fell from above 60 to 19 micro-farads.

A further example of the invention, prepared as Example 3 above and with the same results as Example 3 set out in Table I, was rubbed fairly vigorously with lens tissue. Its polarization resistance was then 0.189 kilo-ohms and its capacitance unchanged at greater than 60 micro-farads. A platinum-black on platinum control was given the same treatment, whereupon its polarization resistance rose to 0.22 kilo-ohms and its capacitance dropped to only 3.9 micro-farads.

The electrode of the present invention has application to other uses where a low impedance to alternating current is required, and more particularly to uses where high wettability, a low polarization resistance and a low capacitive reactance are required. Thus the electrode of the present invention is generally applicable to scientific instruments involving liquid phases, for example conductivity meters and level sensing probes, and to fuel cell electrodes and other electrodes concerned with electromechanical oxidations and reductions.

We claim:

1. A system comprising means for providing an alternating magnetic field in a liquid phase so as to induce an alternating voltage therein, and a pair of contact electrodes positioned at right angles to said field to sense the alternating voltage thus induced, each of said electrodes being an electrode comprising a substrate body of a metal selected from the group consisting of gold, platinum and alloys thereof, with at least one coating of a precious metal or alloy fired on at least part of the surface of said body from a paint containing the precious metal or alloy, said electrode being characterized by its low impedance to the passage of alternating current even after repeated autoclaving in steam.

2. An electromagnetic flowmeter for measuring the flow of a liquid, said flowmeter comprising an electromagnetic coil providing an alternating magnetic field transversely to the direction of liquid flow so as to induce an alternating voltage in said liquid, the magnitude of said voltage being dependent on the velocity of said liquid flow, and contact electrodes positioned at right angles to the direction of said magnetic field to sense said voltage, each of said electrodes being an electrode comprising a substrate body of a metal selected from the group consisting of gold, platinum and alloys thereof, with at least one coating of a precious metal or alloy fired on at least part of the surface of said body from a paint containing the precious metal or alloy, said electrode being characterized by its low impedance to the passage of alternating current even after repeated autoclaving in steam.

3. A system comprising a pair of electrodes, at least one of said electrodes being an electrode comprising a body of a metal selected from the group consisting of gold, platinum and alloys thereof, with at least one coating of a precious metal or alloy fired on at least part of the surface of said body from a paint containing the precious metal or alloy and means for detecting differences in electrical potential between the two electrodes.

4. The system of claim 3 wherein said coating is an alloy of platinum and iridium.

5. The system of claim 4 wherein said platinum-iridium alloy is 70 wt percent platinum, balance iridium.

6. The system of claim 4 wherein said paint is a platinum-iridium resinate paint.

7. The system of claim 4 wherein said paint is fired at a temperature of about 450°C.

8. The system of claim 7 wherein said paint is dried at about 250°C prior to firing.

9. The system of claim 7 wherein there is provided a plurality of paint coatings.

* * * * *